US009841017B1

(12) United States Patent
Blood et al.

(10) Patent No.: US 9,841,017 B1
(45) Date of Patent: Dec. 12, 2017

(54) EXTRACTION DEVICE

(71) Applicants: Scott Blood, Salmon, ID (US); Kevin Drake, Comstock, NE (US)

(72) Inventors: Scott Blood, Salmon, ID (US); Kevin Drake, Comstock, NE (US)

( * ) Notice: Subject to any disclaimer, the term of this patent is extended or adjusted under 35 U.S.C. 154(b) by 579 days.

(21) Appl. No.: 14/520,486

(22) Filed: Oct. 22, 2014

(51) Int. Cl.
*B23Q 3/00* (2006.01)
*F04B 53/14* (2006.01)
*B23P 6/00* (2006.01)

(52) U.S. Cl.
CPC .............. *F04B 53/147* (2013.01); *B23P 6/00* (2013.01)

(58) Field of Classification Search
CPC ............. B23Q 3/00; B23P 19/00; B23P 15/00
See application file for complete search history.

(56) References Cited

U.S. PATENT DOCUMENTS 3,945,104 A * 3/1976 Brookover, Jr. ......... B25D 1/16 29/255
7,121,812 B2 10/2006 Forrest
8,528,462 B2 9/2013 Pacht
8,579,599 B2 11/2013 Leugemors et al.
8,701,546 B2 4/2014 Pacht
8,925,167 B1 * 1/2015 Miller ................... B25B 27/023 254/20
8,931,153 B1 * 1/2015 Kimminau .............. B25B 13/48 29/255
9,009,938 B2 * 4/2015 Noyes ..................... B25B 27/02 254/100
2011/0142699 A1 6/2011 Pacht

FOREIGN PATENT DOCUMENTS

WO WO2011075287 6/2011
WO WO2011117831 9/2011

* cited by examiner

*Primary Examiner* — Lee D Wilson
(74) *Attorney, Agent, or Firm* — Goldstein Law Offices, P.C.

(57) ABSTRACT

An extraction device for use in servicing a pump having a pump housing with a first side, a second side, and a channel extending between the first side and second side. A plunger is located within the channel, and the channel has a threaded opening at the first side. The device includes an externally threaded plug and a driving component selectively extending through the plug. The device is anchored to the pump housing by threading the plug into the threaded opening at the first side. The driving component is then extended into the channel, through and beyond the plug, to engage the plunger and push it out of the housing at the second side.

10 Claims, 7 Drawing Sheets

EXTRACTION DEVICE

TECHNICAL FIELD

The present disclosure relates generally to an extraction device. More particularly, the present disclosure relates to a device for extracting a plunger from a pump which eliminates pinch points potentially injurious to a user while removing the plunger from the pump.

BACKGROUND

User safety inevitably becomes a chief concern in any industry where over-sized and weighty machinery, such as fluid pumps, are used. This is the case in the oil industry where large and heavy high pressure pumping systems are indispensable, and thus widely used. These high pressure pumping systems often employ plunger pumps which have at least one cylindrical plunger sliding through a stationary high-pressure seal to create the high pressure necessary to force material through the pump. Far from maintenance free, these pumps often need to be stripped and have several parts replaced due to the general wear of the internal components and the contamination of the plungers.

Stripping the pumps and replacing pump parts involves a series of dangerous and arduous tasks when considering that the pump body, including the plungers and other internal components, often weigh in excess of three thousand pounds. Such removal and manipulation often requires an enormous amount of brute force to be exerted by a mechanic. As a best attempt to remove, replace, and manipulate the pump parts and the industrially-sized fasteners retaining them within the pump, mechanics employ an array of crude tools, such as sledge hammers, rods, and wrenches.

As a result, the mechanic often struggles to engage each tool effectively while avoiding the placement of his extremities at a pinch point wherein they can be severely injured, such as between the tool and the body of the pump. Further, more than one mechanic is often necessary to remove pump components. For example, in practice, a first mechanic might align a rod against the component, while a second mechanic swings a sledge hammer towards the rod to create the force used to remove and replace the pump parts. However, the second user might fail to strike the rod and injure himself or the first mechanic.

One such task involved in stripping the pump requires the removal and replacement of one or more plungers and its associated packing from a pump housing. Removal of the plunger is traditionally accomplished using an elongated rod inserted through an opening at the surface of the pump housing into a plunger well. Once the rod is positioned against the plunger, a hammer is used to strike the rod and forcefully direct the plunger out a second opening at the opposing surface of the pump housing.

However, because of the pinch points created between the handle of the rod and the hammer, the mechanic is often unable to drive the plunger from the pump housing in a safe and effective manner. The mechanic may struggle to hold the rod against the plunger, while trying to both avoid striking his fingers and hit the rod with enough force to direct the plunger from the pump housing. As a result, the user is often left with one or more crushed fingers. Further, the user can also miss the rod entirely and strike the surface of the pump causing damage to the pump housing.

Yet further, while methods exist for the complete removal of one side of the pump housing to enable access to all of the components therein, such methods are time consuming and physically draining to perform given the massive size and weight of the pump housing.

While these procedures and tools may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a complete solution for extracting plungers from a plunger pump housing. Accordingly, the present disclosure provides an example embodiment of an extraction or a plunger pushing device including a plug for anchoring the device at a first side of a pump housing and a driving component extending through the plug for pushing the plunger out a second side of the housing.

Another aspect of an example embodiment in the present disclosure is to provide a device which eliminates pinch points potentially injurious to a user while enabling the removal of a plunger from a pump housing. Accordingly, the present disclosure provides an example embodiment of a plunger pushing device wherein the driving component includes a leveraging handle distal to the pump housing where a driving force is inputted by a user, and an opposing driving end proximal to the pump housing where the driving force is outputted against a plunger for removal from the housing.

A further aspect of an example embodiment in the present disclosure is to provide a device which enables the use of a continuous and substantial force to remove a plunger from the pump housing. According, the present disclosure provides an example embodiment of the driving component having a threaded exterior surface configured for providing the mechanic with a significant mechanical advantage that slowly and powerfully pushes the plunger as the driving component is rotated.

Yet a further aspect of an example embodiment in the present disclosure is to provide a device which can be anchored to an opening of the pump housing and which does not need to be held by the mechanic when pushing against the plunger. Accordingly, the present disclosure provides an example embodiment a plunger pushing device including a plug having a diameter substantially the same as the diameter of the opening within the pump housing and a threaded exterior surface for mating with the threaded interior surface of the opening.

Accordingly, the present disclosure describes an extraction device for use in servicing a pump having a pump housing with a first side, a second side, and a channel extending between the first side and second side. A plunger is located within the channel, and the channel has a threaded opening at the first side. The device includes an externally threaded plug and a driving component selectively extending through the plug. The device is anchored to the pump housing by threading the plug into the threaded opening at the first side. The driving component is then extended into the channel, through and beyond the plug, to engage the plunger and push it out of the housing at the second side.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 4:
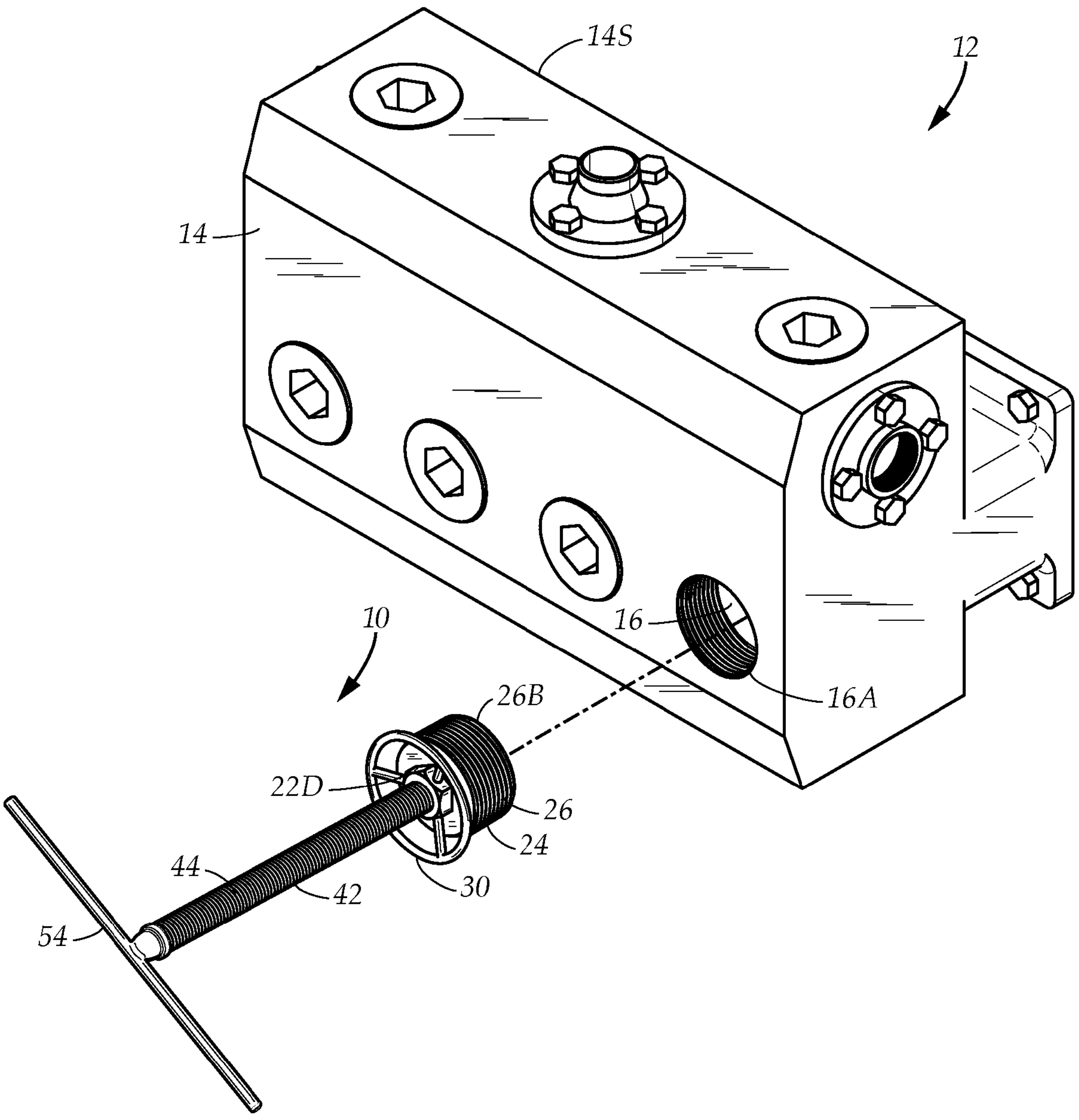
FIG. 4 is a diagrammatic perspective view showing the orientation of the extraction device before it is anchored within a pump housing, according to the present disclosure.

FIG. 4 illustrates an example embodiment of an extraction device 10 for removing plungers from a plunger pump housing 12. The pump housing 12 includes a first side 14F, a second side 14S, at least one channel 16 extending from the first side 14F to the second side 14S, and a plunger located within the channel 16. As further illustrated, the channel 16 has a threaded opening 16A at the first side 14F. While described within the context of removing plungers from a pump housing, it is understood that the extraction device is configured for use in removing another item, including similarly retained pump parts from within the pump housing.

Figure 1:
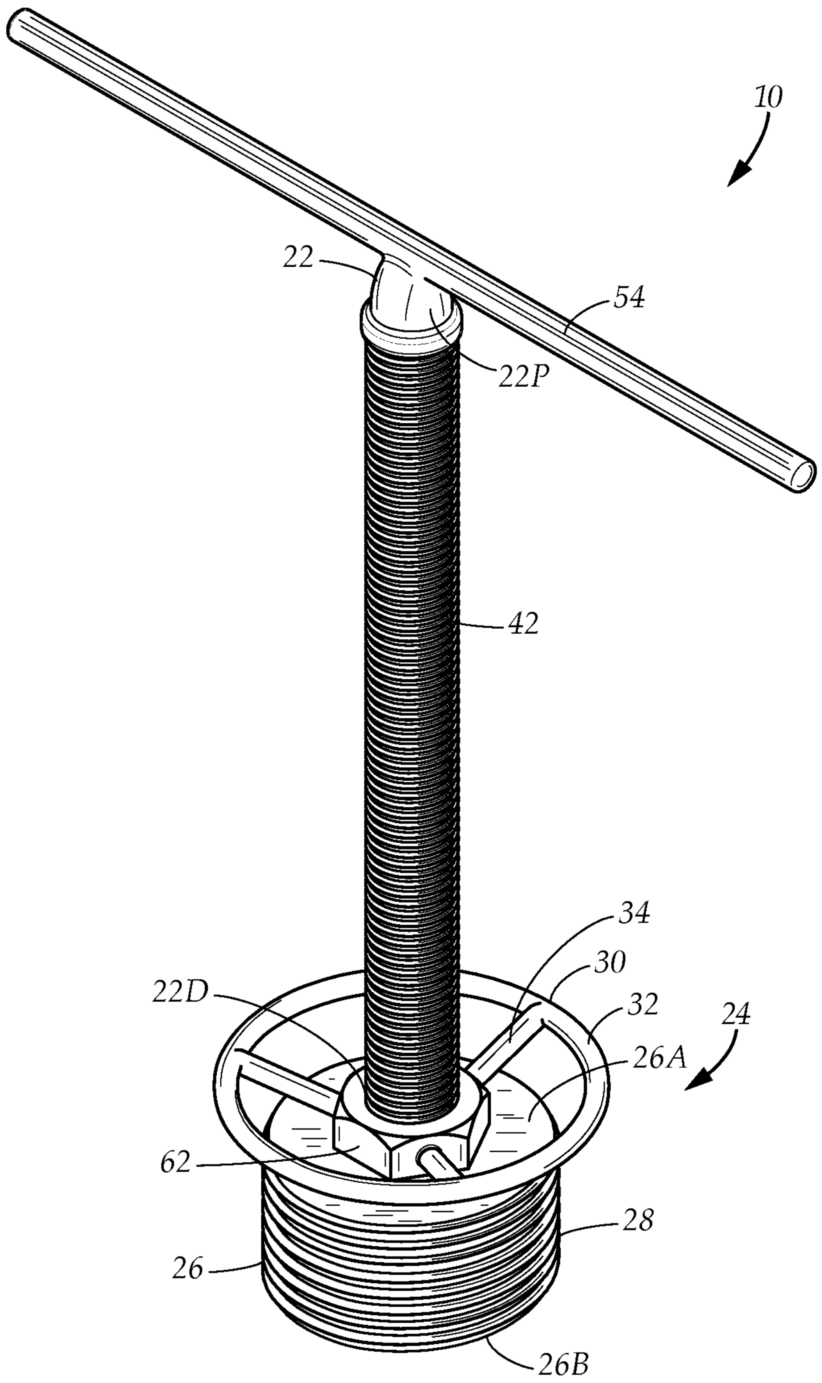
FIG. 1 is a diagrammatic perspective view of an example embodiment of an extraction device, according to the present disclosure.
Figure 5A:
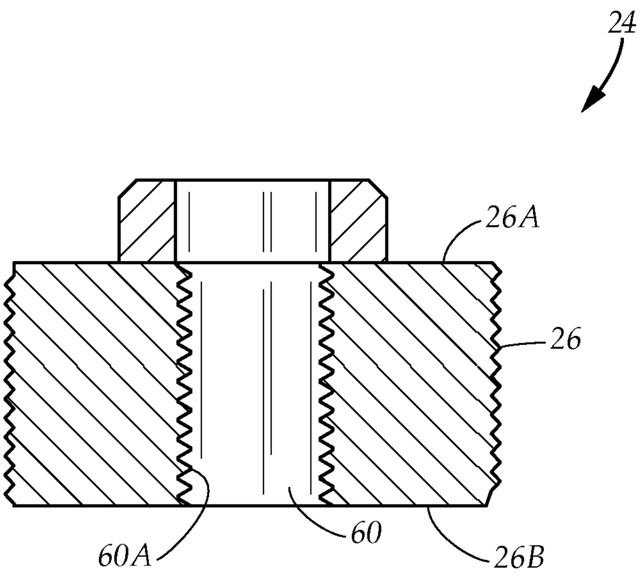
FIG. 5A is a diagrammatic cross-sectional view of the plug including a central bore having an internally threaded portion, according to the present disclosure.

Referring simultaneously to FIGS. 1 and 5A, the extraction device 10 includes a driving component 22 and a plug 24 through which the driving component 22 extends for gradually pushing the plunger out of the second side 14S of the housing 12. The plug 24 includes a barrel 26 having a top 26A, a bottom 26B, and an externally threaded surface 28 extending between the top 26A and the bottom 26B. The externally threaded surface 28 enables a mechanic to securely anchor the device 10 within the housing 12 by threading the barrel 26 into the threaded opening 16A of the channel 16 at the first side 14F of the housing 12. The plug 24 further includes a central bore 60 having an internally threaded portion 60A. The central bore 60 is coaxial with the barrel 26 and extends fully between the top 26A and the bottom 26B.

Figure 3A:
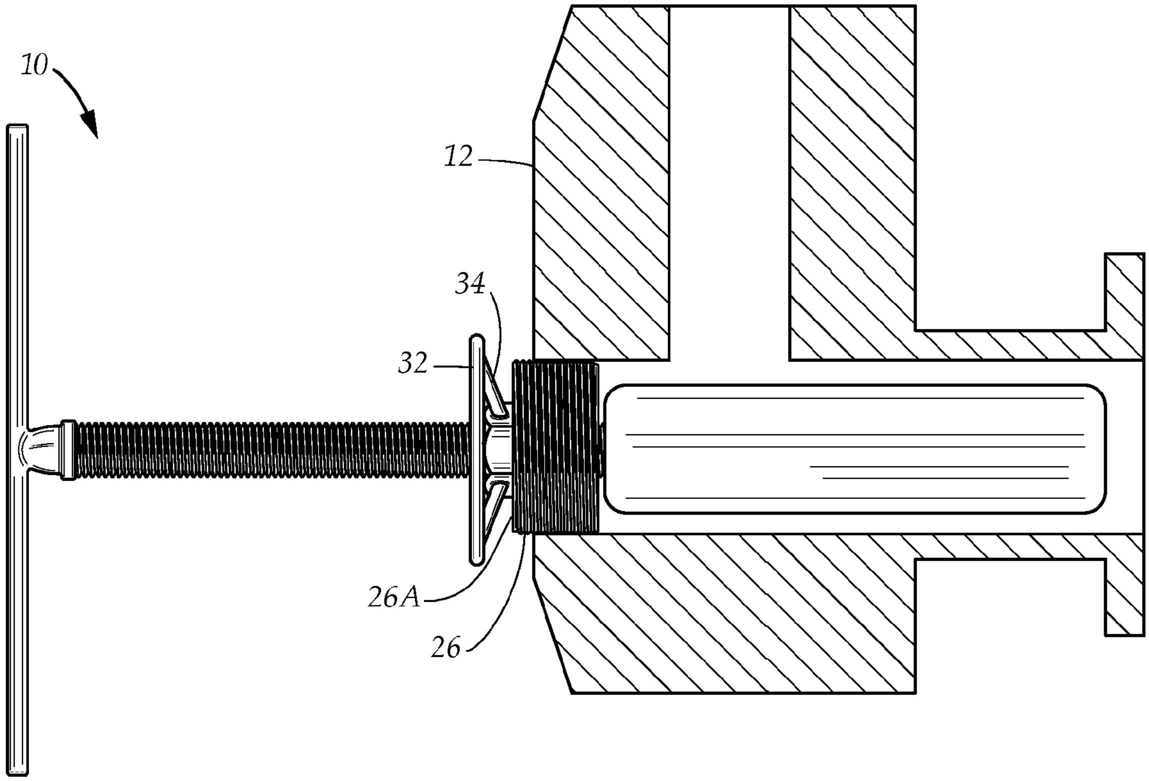
FIG. 3A is a side elevational view, with parts broken away, of an example embodiment of the extraction device anchored within the pump housing before the plunger is extracted, according to the present disclosure.

FIG. 1 further illustrates an example embodiment of the plug 24 having a hand wheel 30 operably coupled to the top 26A of the barrel 26 for providing leverage while rotating the barrel 26 to fasten the plug 24 within the threaded opening 16A of the channel 16. The hand wheel 30 includes an outer rim 32 and a plurality of spokes 34. In an example embodiment, the outer rim 32 is concentric with, and larger in diameter than the barrel 26. The spokes 34 are angled with respect to the top 26A of the barrel 26 to space the outer rim 32 away from the barrel 26, and consequently, away from the pump housing 12, as illustrated in FIG. 3A. With the spokes 34 thus configured, the device 10 effectively reduces the presence of pinch points when it is engaged for use.

Figure 5B:
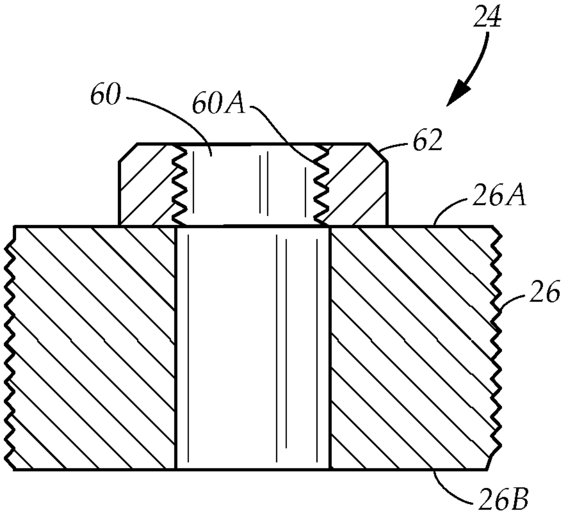
FIG. 5B is a diagrammatic cross-sectional view of the plug including a fastener operably coupled thereto, the fastener having an internally threaded portion, according to the present disclosure.

Referring now to FIG. 5B, another example embodiment of the plug 24 further includes a fastener 62, such as a nut, coupled to the top 26A of the barrel 26. However, it is understood that the fastener 62 may also be operably coupled to the bottom 26B of the barrel 26. The central bore 60 continues into the fastener 62, wherein the internally threaded portion 60A of the central bore 60 is located within the fastener 62. Further, in this example embodiment, the spokes 34 of the hand wheel 30 can extend from the outer rim 32 towards the fastener 62 for operably coupling the hand wheel 30 to the top 26A of the barrel 26.

Figure 2A:
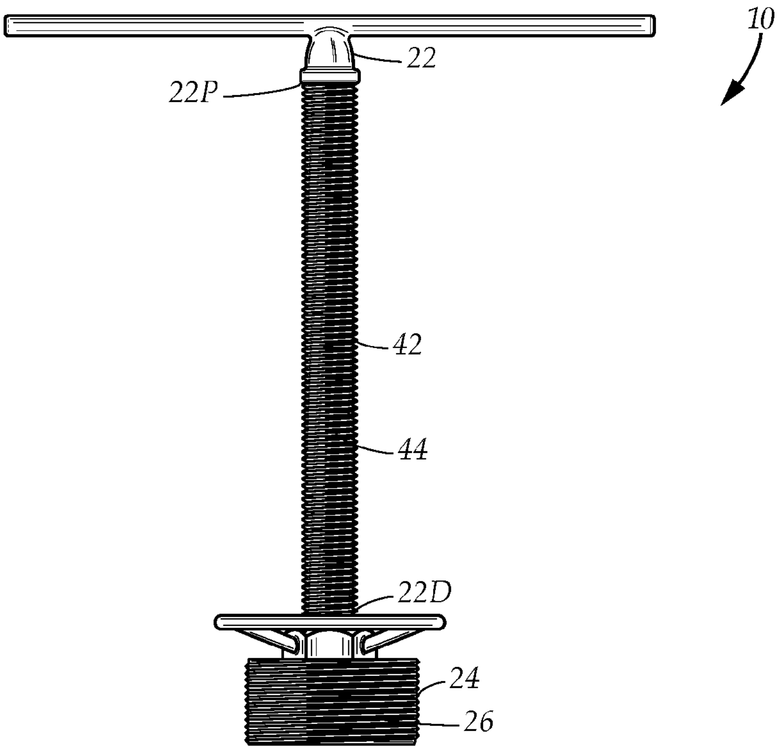
FIG. 2A is a side elevational view of an example embodiment of the extraction device including a driving component and a plug, according to the present disclosure.

FIG. 2A illustrates the plug 24 having a diameter equal to the diameter of the opening 16A within the housing 12 such that the plug 24 is securely anchored therein and does not need to be held against the plunger by the mechanic when pushing the plunger through the housing 12.

FIG. 2A further illustrates an example embodiment of the driving component 22 including a pushing rod 42 having a proximal end 22P, a distal end 22D, and a length extending therebetween. At least a portion 44 of the rod 42 is threaded. The threaded portion 44 of the rod 42 is sized and configured to fit within, and engage the internally threaded portion 60A of the central bore 60, as seen in FIGS. 5A and 5B. When mated with the internally threaded portion 60A of the central bore 60, the threaded portion 44 of the rod 42 provides the mechanic with a significant mechanical advantage which continuously and powerfully pushes the plunger from the housing 12 as the device 10 is rotated, as described hereinbelow. Further, the diameter of the plug 24 can be substantially larger than the diameter of the rod, as illustrated. Yet further, while the barrel 36 is substantially cylindrical, it is understood that the barrel 36 can be variably shaped for enabling compatible use of the device 10 with a wide array of pumps and channel openings.

Figure 3B:
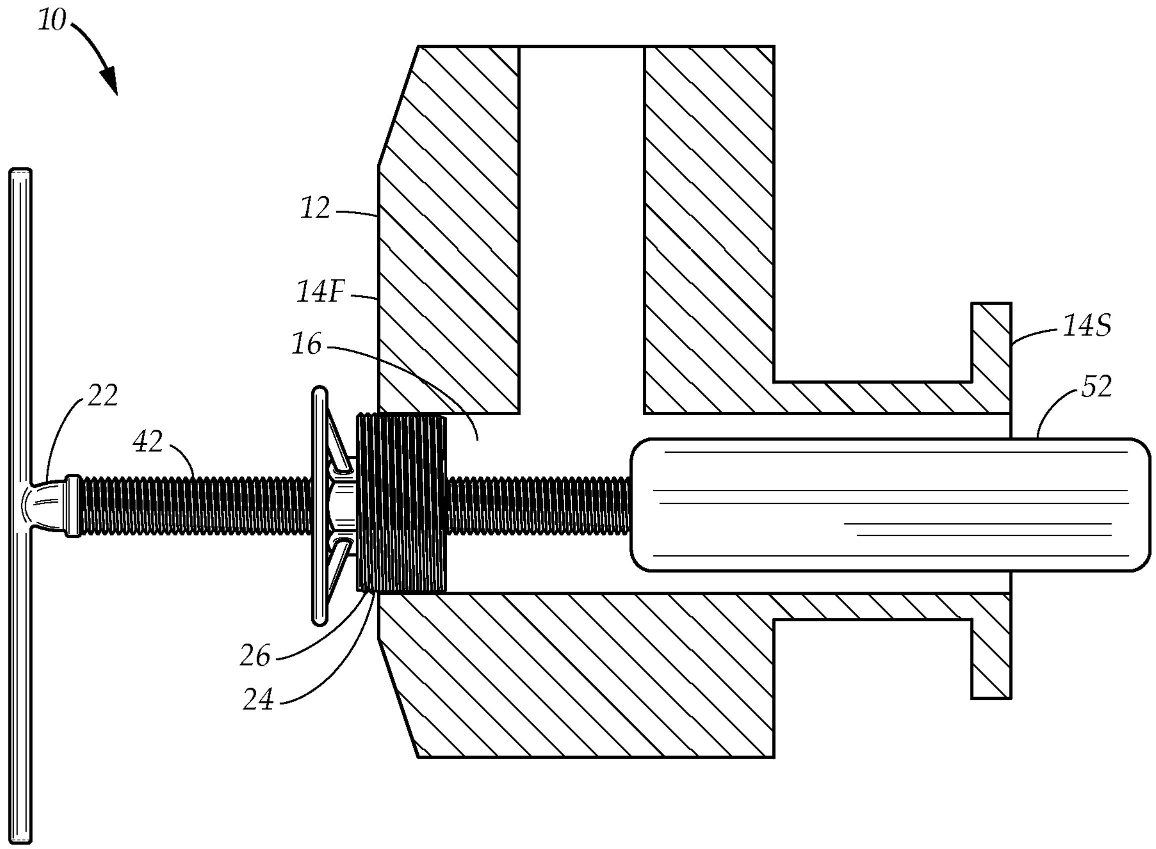
FIG. 3B is a side elevational view, with parts broken away, of an example embodiment of the extraction device anchored within the pump housing, with the driving component extending through and beyond the plug component such that the plunger is partially extracted from the pump housing.

FIG. 3B illustrates an example embodiment of the rod 42 of the driving component 22 extending through and beyond the bottom of the plug 24 to engage a plunger 52 within the pump housing 12. More particularly, the rod 42 is sufficiently long to extend through the barrel 26 anchored within the first side 14F of the housing 12, and to push the plunger 52 through the channel 16 until it is at least partially extracted from the second side 14S of the housing 12. Likewise, the selective removal of the rod 42 from the barrel 26 enables the interchangeability of the plug 24 such that variably-sized and shaped plugs can be operatively used with the rod 42.

Figure 2B:
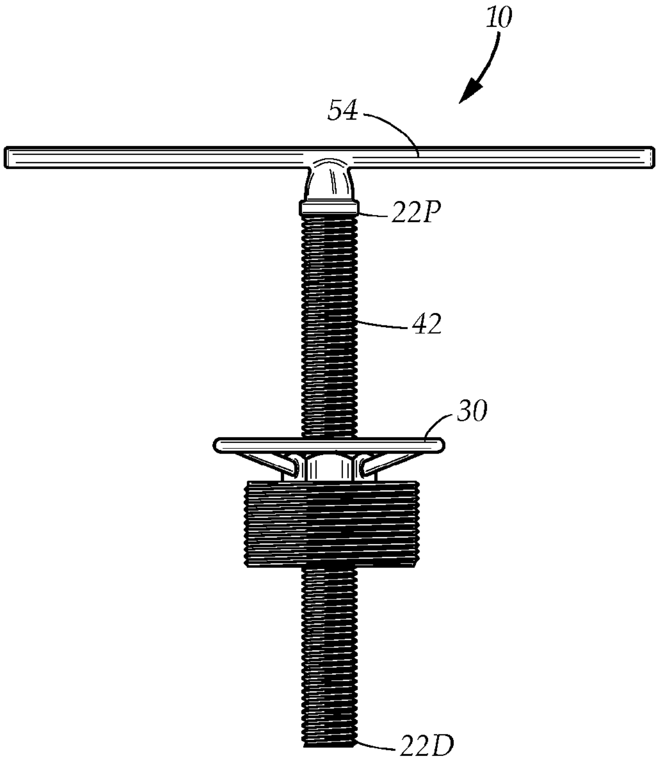
FIG. 2B, similar to FIG. 2A, is a side elevational view of an example embodiment of the extraction device including the driving component extending through and beyond the plug, according to the present disclosure.

Referring back to FIG. 1, the proximal end 22P of the driving component 22 also includes a leverage handle 54 for manually rotating the rod 42 to advance the distal end 22D through the bottom 26B of the barrel 26, as described hereinabove. The handle 54 can be a T-bar oriented substantially perpendicularly to the length of the rod 42, as illustrated in FIG. 1. Alternatively, the handle can be any shape or size which enables the mechanic to safely and continuously advance the driving component through the plug, such as a spherical knob. FIG. 2B illustrates an example embodiment of the device 10 including the pushing rod 42 which is fully threaded between the proximal end 22P and distal end 22D. Accordingly, the length of the rod 42 can likewise be fully extended through the central bore, such as via the rotation of the T-bar leverage handle 52, until the handle 54 and the hand wheel 30 are adjacent to each other.

Figure 2C:
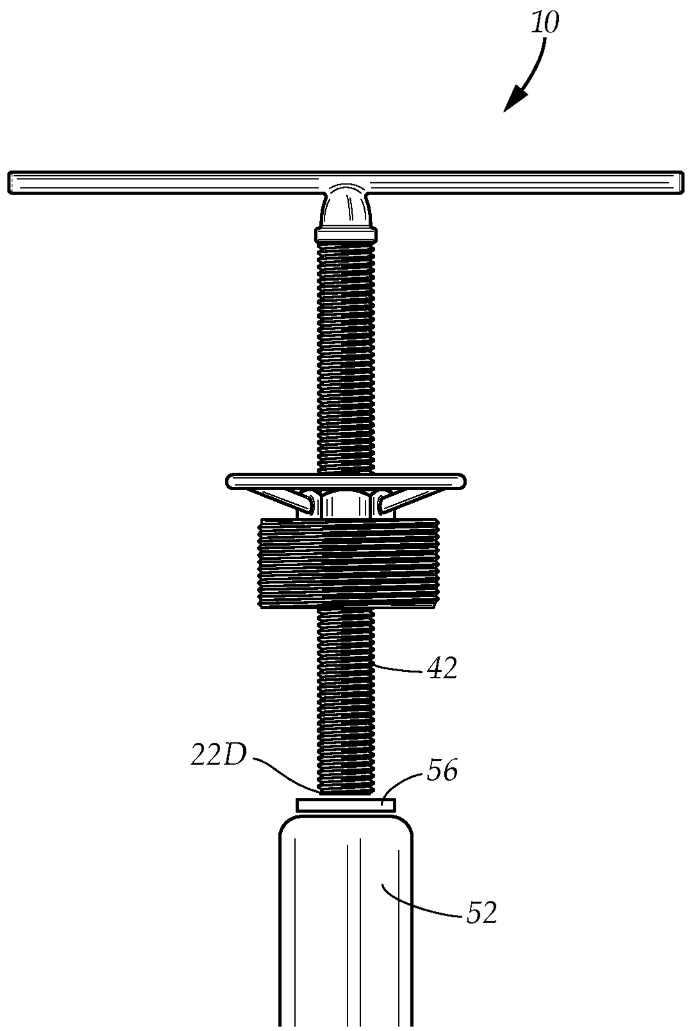
FIG. 2C is a side elevational view of another example embodiment of the extraction device including the driving component having a plate for engaging a plunger when extracting it from a pump housing, according to the present disclosure.

FIG. 2C illustrates another example embodiment of the device 10 including a contact plate 56 operably secured to the distal end 22D, for engaging the plunger 52. The contact plate 56 is of a slightly larger diameter than the diameter of the rod 42 for engaging a larger surface area of the plunger 52. The contact plate 56 thereby enables the rod 42 to exert a more equally distributed pushing force on the plunger 52 as it is advanced through the housing.

FIG. 4 illustrates the orientation of the extraction device 10 before it is anchored within the pump housing 12, and an example method of use. The example method of use includes anchoring the plug 24 to the pump housing 12 by orienting the bottom 26A of the barrel 26 towards the housing 12 and threading the barrel 26 into the threaded opening 16A at the first side 14F of the housing 12. The step of threading the barrel 26 into the threaded opening 16A includes manually turning the hand wheel 30 until the plug 24 is secured therein. The device 10 is then configured to engage the plunger within the channel 16. The step of engaging the plunger within the channel 16 includes extending the distal end 22D of the pushing rod 42 through the plug 24 and beyond the bottom 26B of the barrel 26 by rotating the leverage handle 54 to engage the threaded portion 44 of the rod 42 with the internally threaded portion 60A of the central bore 60 until the rod 42 comes into contact with the plunger. Yet further, the step of pushing the plunger through and out of the channel 16 at the second side 14S of the housing 12 includes continually rotating the leverage handle 54 and advancing the rod 42 through the plug 24.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an extraction device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A plunger pusher for use with a pump having a pump housing having a first side, a second side, a channel extending from the first side to the second side, a plunger located within the channel, the channel having a threaded opening at the first side, comprising:

a plug including a barrel having a top and a bottom, the barrel substantially cylindrical and externally threaded between the top and bottom, and a central bore that is coaxial with the cylinder and extends fully between the top and bottom, the central bore having an internally threaded portion, the barrel for threading into the opening at the first side of the pump housing for anchoring the plunger pusher to the pump housing, the plug also having a hand wheel having an outer rim and spokes, the outer rim concentric with an larger in diameter than the barrel, the hand wheel secured to the top of the barrel by the spokes, the hand wheel secured to the top of the barrel by the spokes for providing leverage while rotating the barrel to fasten the plug within the threaded opening of the channel; and a driving component including a pushing rod having a proximal end and distal end, and a threaded portion located between the proximal end and distal end, the threaded portion sized and configured to fit within the central bore and engage the internally threaded portion of the central bore, the driving component also having a leverage handle attached at the proximal end for manually rotating the pushing rod to advance the distal end of the pushing rod through the bottom of the plug, to engage and push the plunger through the channel.

2. The plunger pusher as recited in claim 1, further comprising a nut, attached to the top of the barrel, the central bore continuing into the nut, wherein the internally threaded portion of the central bore is located within the nut.

3. The plunger pusher as recited in claim 2, wherein the barrel is larger in diameter than the rod, and wherein the leverage handle is a T-bar extending substantially perpendicularly to the rod.

4. The plunger pusher as recited in claim 3, wherein the driving component has a contact plate, secured to the distal end of the rod, for engaging the pusher.

5. The plunger pusher as recited in claim 4, wherein the spokes are angled with respect to the barrel top to space the rim away from the barrel top.

6. An extraction tool, for use with a device having a first side, a second side, and a channel between the first side and second side, the channel having a threaded opening at the first side, for extracting an item located within the channel, comprising:

a plug including a barrel having a top and a bottom, the barrel substantially cylindrical and externally threaded between the top and bottom, and a central bore that is coaxial with the cylinder and extends fully between the top and bottom, the central bore having an internally threaded portion, the plug also including a hand wheel having an outer rim and spokes, the outer rim concentric with and larger in diameter than the barrel, the hand wheel secured to the top of the barrel by the spokes for providing leverage while rotating the barrel to fasten the plug within the threaded opening of the channel for anchoring the extraction tool to the device; and a driving component including a pushing rod having a proximal end and distal end, and a threaded portion located between the proximal end and distal end, the threaded portion sized and configured to fit within the central bore and engage the internally threaded portion of the central bore, the driving component also including a leverage handle attached at the proximal end for manually rotating the pushing rod to advance the distal end of the rod through the bottom of the plug, to engage and push the item through the channel.

7. The extraction tool as recited in claim 6, further comprising a nut, attached to the top of the barrel, the central bore continuing into the nut, wherein the internally threaded portion of the central bore is located within the nut.

8. The extraction tool as recited in claim 7, wherein the barrel is larger in diameter than the rod, and wherein the leverage handle is a T-bar extending substantially perpendicularly to the rod.

9. The extraction tool as recited in claim 8, wherein the driving component has a contact plate, secured to the distal end of the rod, for engaging the pusher.

10. The extraction tool as recited in claim 9, wherein the spokes are angled with respect to the barrel top to space the rim away from the barrel top.

* * * * *